(12) United States Patent
Jeon et al.

(10) Patent No.: US 10,753,316 B2
(45) Date of Patent: Aug. 25, 2020

(54) HIGH PRESSURE FUEL PUMP AND LPDI SYSTEM INCLUDING THE SAME

(71) Applicant: MOTONIC CORPORATION, Seoul (KR)

(72) Inventors: Wan Jae Jeon, Daegu (KR); Jun Hyeok Lee, Daegu (KR); Yong Deok Park, Daegu (KR); Dae Yong Kim, Daegu (KR); Seung Jin Park, Daegu (KR)

(73) Assignee: MOTONIC CORPORATION, Seoul (KR)

( * ) Notice: Subject to any disclaimer, the term of this patent is extended or adjusted under 35 U.S.C. 154(b) by 0 days.

(21) Appl. No.: 16/240,205

(22) Filed: Jan. 4, 2019

(65) Prior Publication Data

US 2019/0293028 A1 Sep. 26, 2019

(30) Foreign Application Priority Data

Mar. 21, 2018 (KR) .................. 10-2018-0032744

(51) Int. Cl.
*F02M 21/02* (2006.01)
*F02B 69/04* (2006.01)
*F02D 19/02* (2006.01)
*F02D 41/00* (2006.01)
*F02D 41/06* (2006.01)

(52) U.S. Cl.
CPC ......... *F02M 21/0245* (2013.01); *F02B 69/04* (2013.01); *F02D 19/022* (2013.01); *F02D 41/0027* (2013.01); *F02M 21/0209* (2013.01); *F02M 21/0239* (2013.01); *F02M 21/0248* (2013.01); *F02D 41/065* (2013.01); *F02M 21/0221* (2013.01)

(58) Field of Classification Search
CPC ........... F02M 21/0245; F02M 21/0209; F02M 21/0239; F02M 21/0248; F02M 21/0221; F02B 69/04; F02D 19/022; F02D 41/0027; F02D 41/065
USPC ........................................................ 123/446
See application file for complete search history.

(56) References Cited

U.S. PATENT DOCUMENTS

| | | | | |
|---|---|---|---|---|
| 5,881,698 A | * | 3/1999 | Tuckey | F02M 37/10 123/497 |
| 2018/0010537 A1 | * | 1/2018 | Song | F02D 41/0027 |

FOREIGN PATENT DOCUMENTS

| KR | 10-2011-0012836 A | 2/2011 |
|---|---|---|
| KR | 10-2012-0064815 A | 6/2012 |
| KR | 10-1787595 B1 | 10/2017 |

* cited by examiner

*Primary Examiner* — Mahmoud Gimie
(74) *Attorney, Agent, or Firm* — Novick, Kim & Lee, PLLC; Jae Youn Kim

(57) ABSTRACT

Provided is a high pressure fuel pump that smoothly achieves fuel supply while running and quickly relieves vapor generated during a restart by a piston operation of a high pressure fuel pump to improve a startup delay phenomenon, and an LPDI system including the same.

8 Claims, 5 Drawing Sheets

HIGH PRESSURE FUEL PUMP AND LPDI SYSTEM INCLUDING THE SAME

CROSS-REFERENCE IN THE RELATED APPLICATIONS

This application claims priority to and benefit of KR10-2018-0032744, filed Mar. 21, 2018, of which disclosure is incorporated herein by reference in its entirety.

BACKGROUND OF THE INVENTION

1. Field of the Invention

The present invention relates to a high pressure fuel pump and a liquid petroleum direct injection (LPDI) system including the same, and more particularly, to a high pressure fuel pump and an LPDI system including the same, capable of smoothly supplying a fuel during running and preventing the start-up delay by quickly relieving vapor generated during restarting through the piston operation of the high pressure fuel pump.

2. Description of the Related Art

In general, unlike a mechanical type LPG fuel system which depends on the pressure of a fuel tank, a direct injection type LPDI system has a high pressure fuel pump installed in a fuel supply line, and a liquid fuel, which is discharged at high pressure from the high pressure fuel pump, is injected into a bombe from an injector to drive an engine.

Such a direct injection LPDI system improves the power performance of a vehicle, improves the fuel efficiency by reducing fuel consumption, and reduces carbon emissions.

In the direct injection type LPDI system, an LPG fuel is vaporized and compressed due to the fuel characteristics in the process of using the LPG fuel. This phenomenon is referred to as vapor rock phenomenon, and there is a problem that the startability is deteriorated by the vapor rock phenomenon. More specifically, at a specific time point in which the temperature of the high pressure fuel pump falls down, the vapor lock may be generated by the fuel vaporized in the high pressure fuel pump, so that startup is not smoothly performed at the time of starting.

RELATED ART DOCUMENTS

Patent Documents (Patent Document 1) Korean Unexamined Patent Publication No. 10-2011-0012836 (published on Feb. 9, 2011)

SUMMARY OF THE INVENTION

Therefore, an object of the present invention is to provide a high pressure fuel pump and a liquid petroleum direct injection (LPDI) system including the same, capable of smoothly supplying a fuel during running and preventing the start-up delay by quickly relieving vapor generated during restarting through the piston operation of the high pressure fuel pump.

In order to achieve the above object, the present invention provides a high pressure fuel pump including: a body formed at one side thereof with a suction hole into which a fuel is supplied from a fuel bombe; a pressurizing device coupled to the body to form a high pressure portion such that a part of the fuel is pressurized in the high pressure portion; a discharge hole for discharging the part of the fuel pressurized by the pressurizing device; and a recovery hole for delivering a residual fuel, except for the part of the fuel pressurized by the pressurizing device, introduced through the suction hole to a fuel recovery line connected to the fuel bombe, wherein the body includes: a low pressure portion serving as a movement path formed in the body to deliver the residual fuel from the suction hole to the recovery hole; and a micro-pipe portion formed between the high pressure portion and the low pressure portion for discharging a gaseous fuel in the high pressure portion to the low pressure portion.

In addition, the present invention provides a liquid petroleum direct inject (LPDI) system including: a fuel pump for pumping a fuel stored inside a fuel bombe to supply the fuel toward an engine; a high pressure fuel pump that receives the fuel supplied by the fuel pump through a suction hole formed in a body, pressurizes a part of the fuel to a high pressure in a high pressure portion formed inside the body, and delivers a residual fuel, except for the pressurized fuel, to a fuel recovery line through a recovery hole communicating with a low pressure portion such that the residual fuel is recovered to the fuel bombe; a delivery pipe connected to a discharge hole of the high pressure fuel pump through which the pressurized fuel is discharged, in which the pressurized fuel is filled in the delivery pipe; an injector for directly injecting the fuel filled in the delivery pipe into a combustion chamber of the engine; an electronic control portion for generating a control signal for controlling operations of a motor and an injector in the fuel pump and a valve in the high pressure fuel pump based on a target RPM of the engine; and a motor controller for controlling driving of the motor in accordance with the control signal, wherein the body of the high pressure fuel pump is provided with a micro-pipe portion that allows the high pressure portion to communicate with the low pressure portion.

The high pressure fuel pump and the liquid petroleum direct injection (LPDI) system including the same according to the present invention can smoothly supply a fuel during running and prevent the start-up delay by quickly relieving vapor generated during restarting through the piston operation of the high pressure fuel pump.

DETAILED DESCRIPTION OF THE INVENTION

Figure 1:
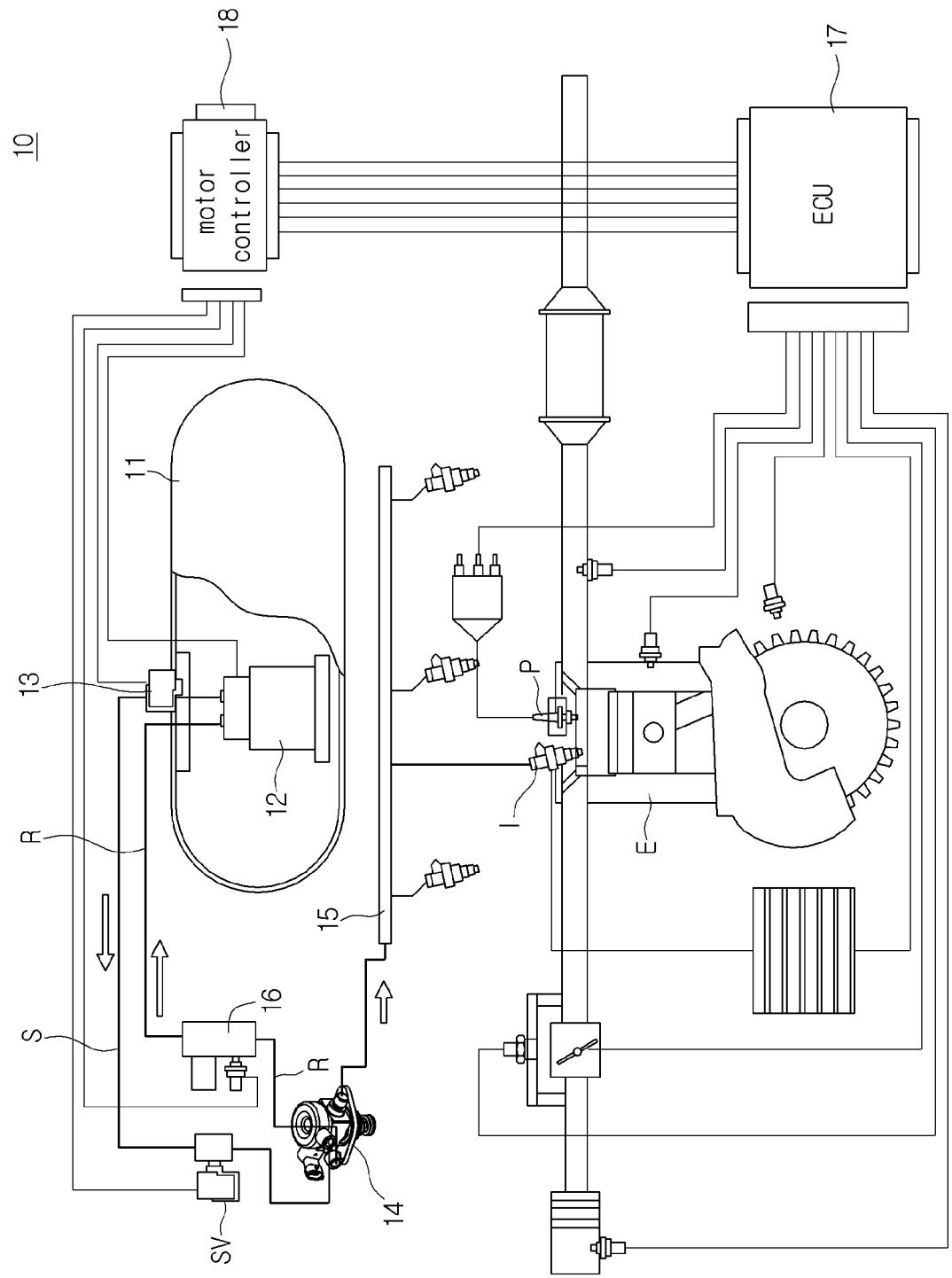
FIG. 1 is a view showing a configuration of an LPDI system including a high pressure fuel pump according to the present invention.

Hereinafter, embodiments of the present invention will be described with reference to the accompanying drawings so that those skilled in the art can easily carry out the present invention. It is to be noted that the same reference numerals are assigned to the same elements throughout the drawings as possible. In the following description of the present invention, detailed description of known functions and configurations incorporated herein will be omitted when it may make the subject matter of the present invention rather unclear. In addition, certain features shown in the drawings are intended to be reduced, enlarged or simplified for clarity of illustration and the drawings and the elements thereof are not necessarily drawn with the accurate scale. However, those skilled in the art will readily understand these details.

FIG. 1 is a view showing a configuration of an LPDI system including a high pressure fuel pump according to the present invention.

In the present embodiment, a fuel supplied through a fuel supply line S by the pumping operation of a fuel pump 12 at the time of starting an engine is initially delivered to a high pressure fuel pump 14 at a predetermined pressure, for example 45 bar, and the fuel pressure supplied at the time of starting the engine is referred to as a "low pressure state".

The delivery path for delivering an LPG fuel of the low pressure state from a suction hole of the high pressure fuel pump 14 to a fuel recovery line R through a recovery hole is referred to as a "low pressure portion 30 (see FIG. 3)".

As shown in FIG. 1, a direct injection type LPDI system 10 according to a first embodiment of the present invention includes a bombe 11 for storing a fuel, a fuel pump 12 installed in the bombe 11 to pump the fuel, a fuel supply line S for supplying the fuel pumped by the fuel pump 12 to an engine E, a high pressure fuel pump 14 for pressurizing the fuel pumped by the fuel pump 12 to a high pressure, a fuel recovery line R that recovers a part of the fuel, which is supplied to the high pressure fuel pump, from the low pressure portion 30 to the bombe 11 of the high pressure fuel pump 14, a delivery pipe 15 that is filled with the fuel pressurized by the high pressure fuel pump 14 at a high pressure, an injector I for directly injecting the fuel filled in the delivery pipe 15 at the high pressure into a combustion chamber of the engine E, an electronic control portion (hereinafter, 'ECU') 17 for controlling the operations of a motor inside the fuel pump 12 and the injector I based on the target RPM of the engine E, and a motor controller 18 for controlling the driving of the motor in accordance with the control signal of the ECU 17.

A shutoff valve SV is installed at a front end of the high pressure fuel pump 14 of the fuel supply line S, in which the shutoff valve SV is opened and closed in response to the drive signal of the motor controller 18 based on the control signal from the ECU 17 to shut off the fuel supplied from the bombe 11, and a fuel pressure regulator 16 may be installed at a rear end of the high pressure fuel pump 14 of the fuel recovery line R in order to reduce the pressure of the fuel recovered from the low pressure portion 30 of the high pressure fuel pump 14 to the bombe 11.

The fuel pump 12 pumps the LPG fuel stored in the bombe 11 and supplies the LPG fuel to the fuel supply line S. The fuel supplied through the fuel supply line S is initially delivered to the high pressure fuel pump 14 at a low pressure state, for example, at a pressure of about 45 bar.

The high pressure fuel pump 14 pressurizes a part of the fuel, which is pumped by the fuel pump 12 and supplied through the fuel supply line S at a low pressure, to a high pressure, for example, about 40 bar to 150 bar, in order to supply the pressurized fuel to the delivery pipe 15, and the remaining fuel is recovered from the low pressure portion (30) to the bombe (11) through the fuel recovery line (R).

Meanwhile, first and second pressure sensors (not shown) are provided at a front end of the high pressure fuel pump 14 of the fuel supply line S and a rear end of the high pressure pump 14 of the fuel recovery line R in order to confirm the fuel pressure to be moved, and a third pressure sensor (not shown) may be installed in the delivery pipe 15.

Thus, the ECU 17 may generate a control signal to the motor controller 18 in order to control the shutoff valve SV, the fuel pump 12, a multi-valve 13, and a fuel pressure regulator 16 based on the fuel pressure sensed by the first and second pressure sensors and the third pressure sensor provided on the delivery pipe 15.

In addition, the LPDI system including the high pressure fuel pump according to the present invention may further include a shutoff valve 19.

The shutoff valve opens and closes the fuel recovery line R according to a control signal of the ECU 17, and may be constituted by a solenoid valve as an example. The shutoff valve can be operated to close the fuel recovery line R for a preset time period when an ignition key is operated at the time of the startup of the engine. Thus, the shutoff valve 19 is closed during the engine startup process to shut off the fuel recovered to the bombe 11, so that the pressure of the fuel supplied to the high pressure fuel pump 14 through the fuel supply line S increase by the pumping operation of the fuel pump 12, thereby compressing the vaporized fuel in the fuel supply line S.

Thus, the high pressure fuel pump 14 can stably receive the fuel, pressurizes the entire supplied fuel to a predetermined high pressure, and supplies the pressurized fuel to the injector I through the delivery pipe 15.

The configuration of the high pressure fuel pump 14 will be described in more detail with reference to FIGS. 2 to 4.

Figure 2:
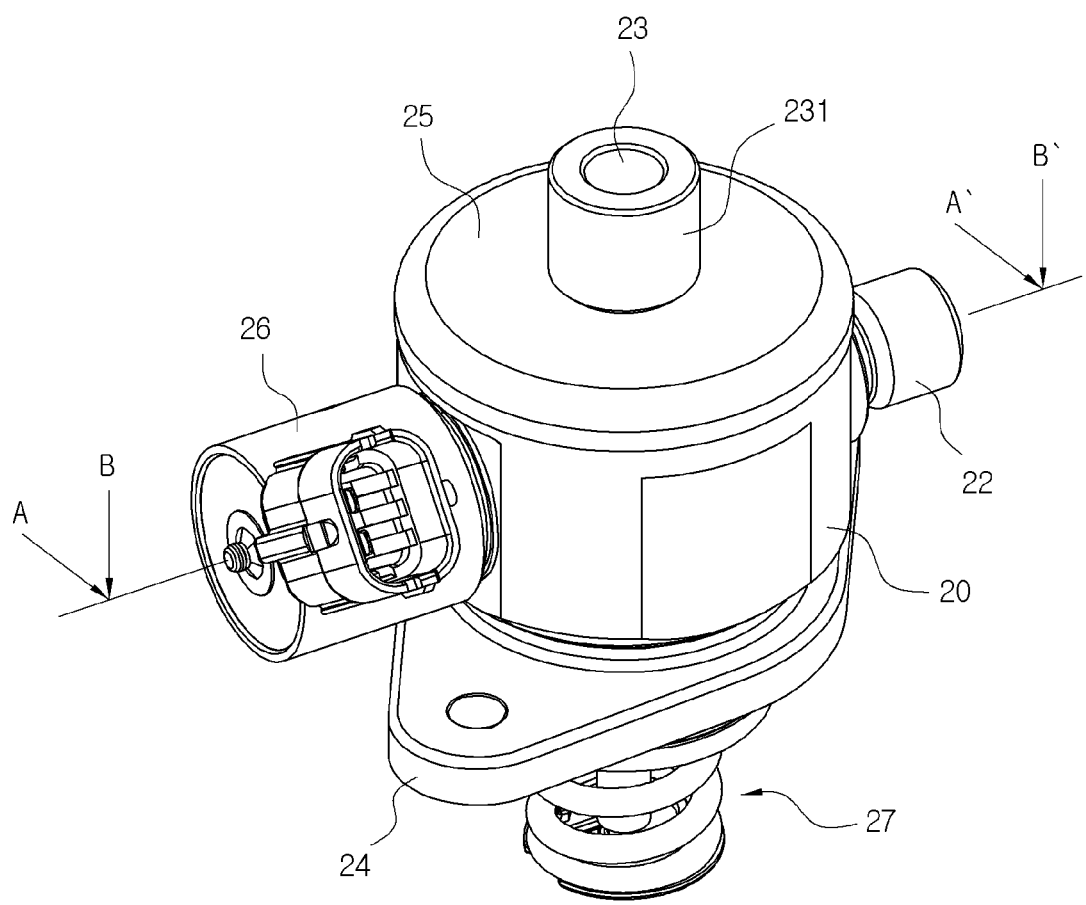
FIG. 2 is a perspective view of the high pressure fuel pump shown in FIG. 1.
Figure 3:
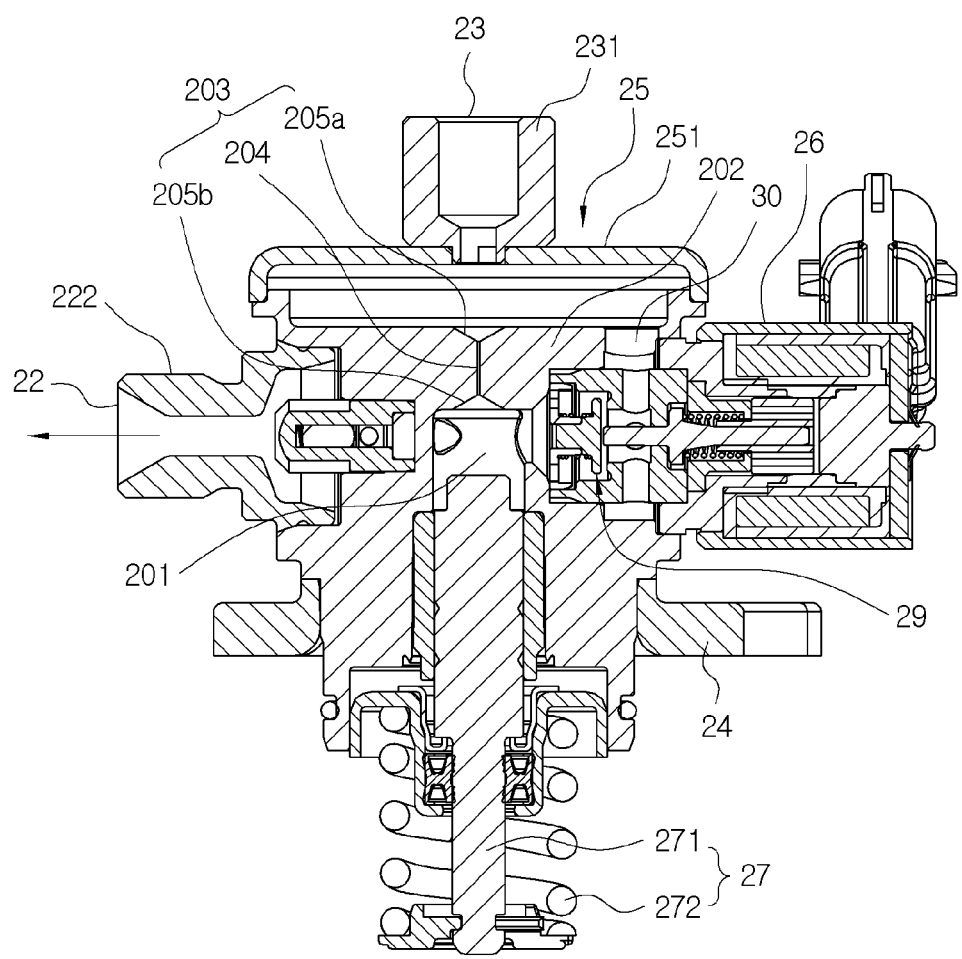
FIG. 3 is a sectional view taken along line A-A' of the high pressure fuel pump shown in FIG. 2.
Figure 4:
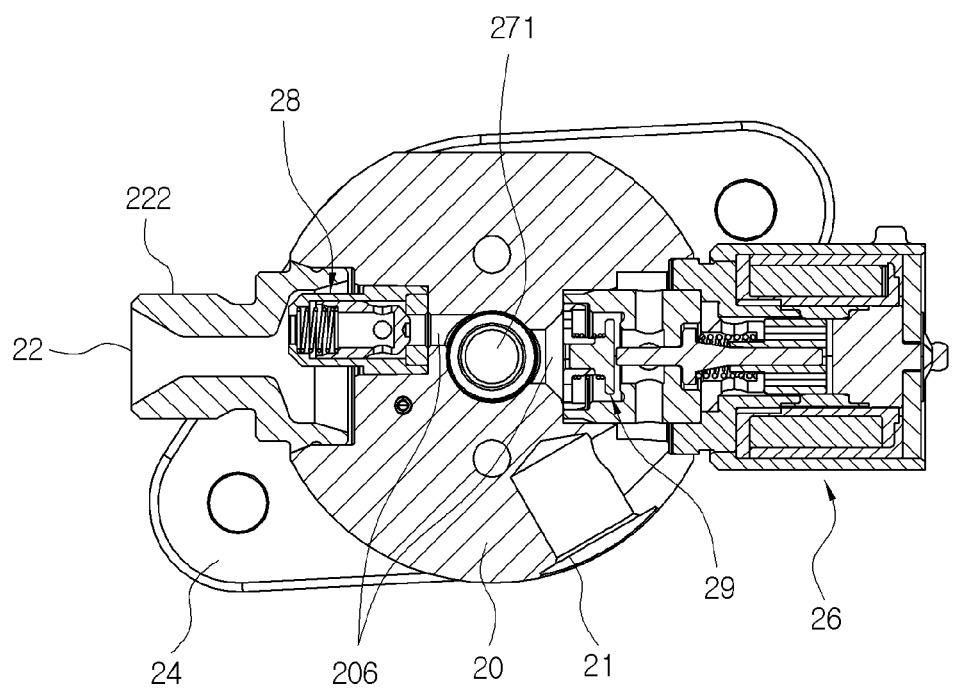
FIG. 4 is a sectional view taken along line B-B' shown in FIG. 2.

FIG. 2 is a perspective view of the high pressure fuel pump shown in FIG. 1, FIG. 3 is a sectional view taken along line A-A' of the high pressure fuel pump shown in FIG. 2, and FIG. 4 is a sectional view taken along line B-B' shown in FIG. 2.

Referring to FIGS. 2 to 4, the high pressure fuel pump 14 includes a body 20 having a suction hole 21 and a discharge hole 22 formed on a side surface thereof, a bracket 24 coupled to a lower portion of the body 20 and provided therein with a pressurizing device 27 for pressurizing a part of the fuel supplied from the bombe 11 through the suction hole 21 at a high pressure, and a spill valve 26 for controlling the flow rate of discharge pressure of the fuel.

The high pressure fuel pump 14 may further include a roller tappet portion (not shown) provided between the body 20 and a cam of an engine camshaft (not shown) to convert the rotational motion of the cam into a linear reciprocating motion and transmit it to the pressurizing device 27 and a damper portion 25 coupled to an upper portion of the body 20 to reduce pulsation of the sucked fuel.

The pressurizing device 27 serves to generate a suction force and a pressing force with respect to an inside of the body 20 for the fuel.

To this end, as shown in FIG. 3, the pressurizing device 27 includes a piston 271 connected to the camshaft of the engine through the roller tappet portion to move up and down, and a return spring 272 coupled to the piston 271 to provide a restoring force.

As shown in FIG. 3, the pressurizing device 27 forms the body 20 and the high pressure portion 201. The high pressure portion 201 is a space in which a part of the fuel is pressurized and serves as a flow path for the pressurized fuel. That is, a part of the fuel supplied to the suction hole 21 is pressurized and formed on the path connected to a discharge hole 22, and is formed on an upper end of the piston 271 of the pressurizing device 27.

Particularly, a micro-pipe portion 203 is formed between the high pressure portion 201 formed by the pressurizing device 27 and the body 20, and the low pressure portion 30 formed inside the body 20.

The micro-pipe portion 203 is used as a passage for discharging the vaporized fuel to the low pressure portion 30 when a part of the fuel is vaporized in the high pressure space. Specifically, the micro-pipe portion 203 is formed at a portion corresponding to a cylinder head so as to communicate between the high pressure portion 201 and the damper portion 25. When the piston 271 moves up for pressurization, the gaseous fuel present with the fuel is discharged to the low pressure portion 30 through the micro-pipe portion 203, and the fuel, which may not be discharged through the micro-pipe portion 203, is pressurized to the high pressure. To this end, a pipe 204 of the micro-pipe portion 203 has a diameter which is experimentally calculated to makes it difficult to flow the liquid while ensuring the flow of the gas. This diameter may be from a few tens of micrometers to a few hundred micrometers (μm), but the size of the diameter may vary depending on the pressure generated by the pressurizing device 27, the pressure of the low pressure portion 30 and the length of the pipe 204.

When the diameter of the pipe 204 of the micro-pipe portion 203 is large, the high pressure portion 201 is not sufficiently pressurized. When the diameter of the pipe 204 is too small, the discharge of the vaporized fuel may become difficult. The micro-pipe portion 203 uses the difference in characteristics between the liquid and the gas, and it is possible to utilize the fact that the fuel existing in the form of an air bubble is easier to move into a fine gap than the liquid fuel.

A part of the fuel may be discharged to the low pressure portion 30 through the micro-pipe portion 203 when the fuel is compressed by the pressurizing device 27. However, when the diameter of the pipe 204 is made sufficiently small, only a little amount of the fuel may be discharged and the fuel may be sufficiently pressurized.

FIGS. 2 to 4 show an example in which a damper is configured. In the case where the damper is omitted, the micro-pipe portion 203 may be formed at another position so as to allow the high pressure portion 201 to communicate with the low pressure portion 30.

A recovery hole 23 for recovering a part of the fuel supplied to the high pressure fuel pump 14 to the bombe 11 may be formed on one side of the damper cover 251, for example, one side or an upper surface of the damper cover 251. FIGS. 2 to 4 show an example in which the recovery hole 23 is formed on the upper surface of the damper cover 251.

A plurality of valleys (not shown) may be formed on an outer surface of the damper portion 25. The damper portion 25 reduces the pulsation of the fuel, which is generated while the fuel is being sucked, only during the suction operation of the piston 271 provided in the pressurizing portion 27, so that the fuel may be stably delivered. The damper portion 25 forms a portion of the low pressure portion 30 between the suction hole 21 and the recovery hole 23 to reduce the pulsation generated from the fuel having the low pressure state. In particular, the damper portion 25 communicates with the high pressure portion 201 through the micro-pipe portion 203 to recover the vaporized fuel. In this case, the damper portion 25 serves to relieve the pulsation generated when the vaporized fuel is discharged to the low pressure portion 30.

To this end, a first taper 205a is formed at the other longitudinal end of the pipe 204 of the micro-pipe portion 203. The first taper 205a is formed by expanding the other end of the pipe 204 in order to reduce a change in the pressure generated when the gas discharged through the pipe 204 is ejected into a large space. As shown in the drawing, the first taper 205a is formed by obliquely forming the longitudinal end of the pipe 204. In addition, a second taper 205b may be provided on the high pressure portion 201.

The second taper 205b guides the gaseous fuel formed in the space of the high pressure portion 201 such that the gaseous fuel may be collected in the pipe 204. In addition, the second taper 205b causes the liquid fuel to be subject to the bottleneck phenomenon during the pressurization process so that the pressure at the front end of the pipe 204 is increased, thereby reducing the amount of the high pressure fuel discharged from the pipe 204.

As shown in FIG. 3, the micro-pipe portion 203 is formed on an extension line of the longitudinal axis (reciprocating direction) of the piston 271, and air bubbles can be advantageously removed if the micro-pipe portion 203 is formed in a direction substantially perpendicular to the moving path of the high pressure fuel, but the present invention is not limited thereto. In FIG. 3, when viewed from the front, the high pressure fuel moves from the spill valve 26 located at a right side to the discharge hole 22 located at a left side, and this direction is assumed to be horizontal.

Since the intensity of the pulsation of the fuel generated during the pumping operation may vary depending on the specification of the high pressure fuel pump 14, the damper portion may be removed when the effect of the pulsation of the fuel on the performance of the high pressure fuel pump 14 is insignificant, and the recovery hole 23 may be formed on one side of the body 20. The following description will be made for the case where the damper portion 25 is configured.

As described above, the high pressure fuel pump 14 according to an embodiment of the present invention has the suction hole 21 formed in the body and the recovery hole 23 formed in the damper portion 25. In addition, the low pressure portion 30 is provided in the body 20 and a part of the fuel having the low pressure state and filled in the low pressure portion 30 is supplied to the bombe 11 through the recovery hole 23 in the direction of the arrow shown in FIG. 3.

In this case, the fuel supplied to the high pressure fuel pump 14 may be recovered before the pressurization except for a part of the fuel to be pressurized, but the present invention is not limited thereto and the recovery time may be changeable.

Therefore, the present invention can prevent the delay of the fuel supply caused by the vaporized fuel formed in the high pressure portion 201, and the pressure of the discharged fuel can be maintained at a high pressure, so that the restartability can be improved.

Particularly, since the volume of the damper portion 25 does not need to be increased, the present invention provides an advantage that the high pressure fuel pump can be made in a small size.

Meanwhile, as shown in FIGS. 3 and 4, the body 20 may be provided therein a discharge-side check valve 28 coupled to the discharge hole 22 and an inlet-side check valve 29 connected to the spill valve 26 to supply the fuel to the discharge-side check valve 28 while preventing the backflow of the fuel introduced into the body 20.

In addition, a discharge port 211, a suction port 221 and a recovery port 231 may be provided in the suction hole 21, the discharge hole 22 and the recovery hole 23, respectively.

In addition, as shown in FIG. 4, the body 20 may be provided therein with a moving path 206 to move the fuel sucked through the suction hole 21 toward the inlet-side check valve 29, the pressurizing device 27, and the discharge hole 22.

Hereinafter, the coupling relationship and operation method of the high pressure fuel pump will be described in detail.

First, after coupling the piston 271 with a return spring 272, the piston 271 is installed inside the body 20.

Then, the suction port 211 is coupled to the suction hole 21 formed at one side of the body 20 and the discharge port 222 is coupled to the discharge hole 22 after installing the discharge-side check valve 28 through the discharge hole 22 formed at the other side of the body 20.

Likewise, the inlet-side check valve 29 is installed through a coupling hole formed at one side of the body 20, and then the spill valve 26 is coupled to the inlet-side check valve 29.

The damper portion 25 is coupled to an upper portion of the body 20 and a recovery port 231 is coupled to the recovery hole 23 formed in one side or an upper surface of the damper portion 25, and the fuel recovery line R is connected to the recovery port 231.

According to the high pressure fuel pump 14 assembled as described above, when the engine is driven, the piston 271 moves up and down in conjunction with the camshaft so that the fuel can be sucked, discharged and recovered.

That is, when the piston 271 moves down, a suction force is generated in the internal space of the body 20, so that fuel is sucked into the internal space of the body 20 through the suction hole 21 formed at one side of the body 20, and the sucked fuel is delivered to the pressurizing device 27 through the moving path 206 formed in the body 20.

In this case, the spill valve 26 opens and closes the inlet-side check valve 29 provided between the damper portion 25 and the pressurizing device 27 to control the flow rate and the discharge pressure of the fuel.

When the high pressure fuel pump supplied with the fuel is turned off as the running of the vehicle ends, the heat generated in the engine may affect the fuel line, or the heat generated during the operation of the spill valve 26 may exert an influence on the fuel line so that the gaseous fuel may be generated in the fuel supplied to the high pressure portion.

When the fuel including the gas mixed with the liquid is supplied to the high pressure portion 201, the fuel vaporized in the compression process of the pressurizing device 27 is discharged to the low pressure portion 30 through the micro-pipe portion 203, so that only the liquid-phase fuel is pressurized and supplied to a fuel system through the discharge hole 22.

In addition, the fuel containing the gas (or air bubbles) remaining in the low pressure portion 30 of the high pressure fuel pump 14 is recovered at a low pressure state to the bombe 11 through the recovery hole 23. For example, according to the experimental data, the high pressure pump 14 recovers about 95% of the fuel, which is pumped by the fuel pump 12 and supplied to the high pressure pump 14, to the bombe 11 through the fuel recovery line R during the idling of the engine E and recovers about 60% of the fuel to the bombe 11 during the normal operation of the engine E.

When the pressure of the fuel recovered to the bombe 11 from the low pressure portion of the high pressure pump 14 reaches about 7 bar by pressurizing the fuel by 45 bar from the low pressure state (2 bar) through the pumping operation of the fuel pump 12, an internal value of the fuel pressure regulator 16 is opened to deliver the fuel to the bombe 11.

In addition, when the internal pressure of the fuel pressure regulator 16 is decreased lower than about 7 bar as the fuel is delivered to the bombe 11 through the opened valve, the fuel pressure regulator 16 closes the valve. When the internal pressure is again increased higher than about 7 bar after closing the valve, the valve is opened again and this operation is repeated.

The pressing pressure is preset to prevent vaporization by pressurizing the fuel recovered to the bombe 11 to achieve the thermal equilibrium in the bombe 11.

Accordingly, the thermal equilibrium is maintained in the bombe 11 due to the fuel discharged from the fuel pump 12 and the fuel recovered from the high pressure pump 14.

In the conventional LPDI system, the fuel stored in the bombe is maintained in a liquid state at an inner lower portion of the bombe due to the fuel being discharged from the bombe, but vaporization occurs in the space formed at an upper portion of the bombe so that the saturated vapor pressure inside the bombe is lowered.

As a result, the internal temperature of the bombe suddenly decreases and the fuel is more easily vaporized, so that the cavitation occurs in the first pumping process, thereby significantly lowering the fuel delivery performance of the fuel pump.

However, according to the present invention, the proper amount of fuel is recovered through the fuel recovery line (R) so that the thermal equilibrium is maintained inside the bombe.

That is, according to the present invention, the level of the liquid fuel can be property maintained in the bombe by recovering the fuel directly to the bombe from the low pressure portion of the high pressure pump, and it is possible to prevent the cavitation by preventing the empty space inside the bombe from being suddenly increased.

In particular, according to the present invention, since the fuel having the low pressure state is recovered before the fuel is supplied to the delivery pipe through the high pressure pump, the fuel can be maintained at a low temperature so that the temperature inside the bombe can be kept constant.

Therefore, the inside of the bombe 11 maintains the thermal equilibrium state. When the thermal equilibrium is established in the bombe 11, the pressurizing and delivering process of the fuel can be smoothly performed, so that the performance of the LPG feed system can be excellently exerted.

In this case, the residual vaporized fuel is discharged through the micro-pipe portion 203 when pressurized, thereby preventing the vapor lock and ensuring the restartability.

The amount of recovered fuel can be property controlled to maintain the thermal equilibrium by performing appropriate evaluation according to the size of the bombe 11 and the displacement of a vehicle.

Meanwhile, since the amount of fuel equal to the amount of fuel injected through the injector I is supplied to the delivery pipe 15 after being pressurized at the high pressure state by the high pressure pump 14, the pressure inside the delivery pipe 15 can be kept constant at the above-mentioned high pressure, that is, about 40 bar to 150 bar.

In this manner, the vaporization of the fuel is suppressed due to the high pressure in the delivery pipe 15 maintained at the high pressure, so that the LPG fuel supplied to the combustion chamber of the engine E through the injector I is maintained in the liquid state.

Therefore, according to the present invention, a part of the fuel supplied to the high pressure fuel pump due to the continuous pumping operation of the fuel pump is recovered to the bombe from the low pressure portion of the high pressure fuel pump so that the thermal equilibrium can be maintained inside the bombe, thereby preventing the LPG fuel from being vaporized due to the increase in fuel temperature inside the bombe.

Accordingly, the present invention can improve the pump efficiency by minimizing the cavitation caused by the vaporization of the LPG fuel during the pressurization and delivery of the fuel, improve the power performance and fuel efficiency of the vehicle by smoothly supplying fuel, and reduce the carbon emission.

In addition, in the fuel introduced into the body, a part of the fuel containing the air bubbles is rapidly recovered to the bombe through the inlet-side check valve of the high pressure fuel pump, so that the fuel can be sufficiently pressurized to a predetermined high pressure when the pressurizing process is performed by using the pressurizing device.

Therefore, the present invention can prevent the restart failure caused by the air bubbles contained in the fuel when the vehicle is restarted after the constant-speed running of the vehicle, thereby improving the restartability.

Meanwhile, although the embodiment in which the suction hole is formed in the body and the recovery hole 23 is formed in the damper portion as shown in FIG. 4 is explained, the present invention is not limited thereto.

Figure 5:
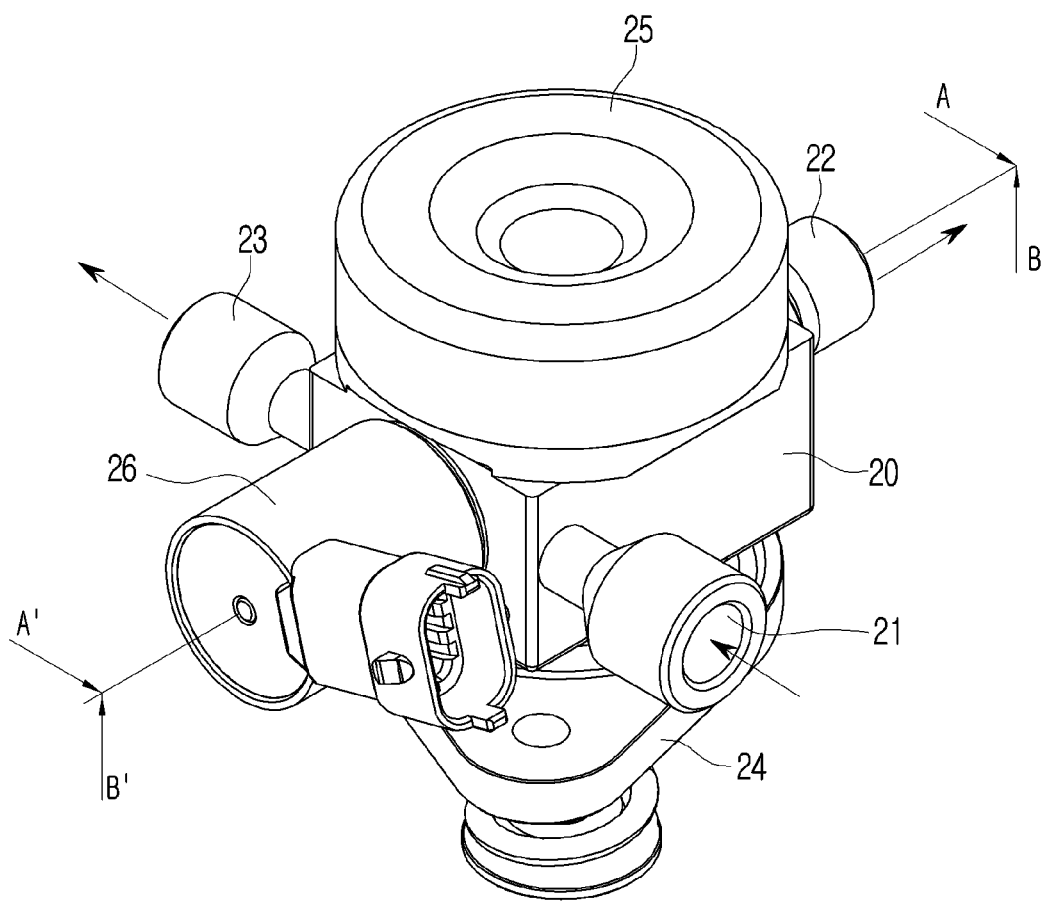
FIG. 5 is a perspective view showing a modified example of the high pressure fuel pump.

For example, FIG. 5 is a perspective view showing a modified example of the high pressure fuel pump.

As shown in FIG. 5, according to the present invention, the suction hole 21 and the recovery hole 23 may be formed to communicate with each other on both sides of the body 20, and the discharge hole 22 may be formed on the other side of the body 20.

That is, the high pressure fuel pump 14 is provided with the suction hole 21 and the recovery hole 23 on both sides of the spill 1 valve 26 and the inlet-side check valve 29. Thus, the fuel is vaporized by the heat generated from the spill valve 26 and the fuel containing the air bubbles is immediately recovered to the bombe 11.

Therefore, according to the present invention, the LPG fuel is vaporized by the heat generated from the operation of the spill valve, and the LPG fuel containing air bubbles is rapidly recovered to the bombe, so that the remaining LPG fuel can be sufficiently pressurized to a preset high pressure.

Accordingly, the present invention can improve the restartability of the vehicle employing the direct injection type LPDI system when the vehicle is restarted after the vehicle is driven at a constant speed.

In addition, according to the present invention, a part of the fuel sucked through the suction hole is directly recovered to the bomb, and only the remaining fuel is delivered to the damper portion, so that the size of the damper portion can be minimized or the damper portion can be removed.

Accordingly, the present invention can minimize the volume of the damper portion, thereby making it possible to manufacture the high pressure fuel pump compactly, thereby reducing the production cost of the product.

While the present invention has been particularly shown and described with reference to exemplary embodiments thereof, it is to be understood that the invention is not limited to the disclosed exemplary embodiments and various modifications can be made within the scope of the present invention. Such modifications are deemed to be within the scope of the present invention, and the scope of the present invention should be determined by the following claims.

What is claimed is:

1. A high pressure fuel pump comprising:
a body having a suction hole into which a fuel is supplied from a fuel bombe;
a pressurizing device coupled to the body to form a high pressure portion such that a part of the fuel is pressurized in the high pressure portion;
a discharge hole for discharging the part of the fuel pressurized by the pressurizing device; and
a recovery hole for delivering a residual fuel, except for the part of the fuel pressurized by the pressurizing device, introduced through the suction hole to a fuel recovery line connected to the fuel bombe,
wherein the body comprises:
a low pressure portion serving as a movement path formed in the body to deliver the residual fuel from the suction hole to the recovery hole; and
a micro-pipe portion formed between the high pressure portion and the low pressure portion for discharging a gaseous fuel in the high pressure portion to the low pressure portion,
wherein the micro-pipe portion includes a pipe which has a diameter determined to prevent the flow of the fuel in a liquid state, while ensuring the flow of the gaseous fuel.

2. The high pressure fuel pump of claim 1, further comprising a damper portion coupled to an upper portion of the body to form a part of the low pressure portion and to reduce pulsation of the fuel supplied through the suction hole,
wherein the micro-pipe portion allows the high pressure portion to communicate with the damper portion.

3. The high pressure fuel pump of claim 2, wherein a tapered portion is formed on at least one of both longitudinal ends of the micro-pipe portion.

4. The high pressure fuel pump of claim 2, wherein the recovery hole is formed in the damper portion.

5. A liquid petroleum direct inject (LPDI) system comprising:
a fuel pump for pumping a fuel stored inside a fuel bombe to supply the fuel toward an engine;
a high pressure fuel pump configured to receive the fuel supplied by the fuel pump through a suction hole formed in a body, pressurize a part of the fuel to a high pressure in a high pressure portion formed inside the body, and deliver a residual fuel, except for the pressurized fuel, to a fuel recovery line through a recovery hole communicating with a low pressure portion such that the residual fuel is recovered to the fuel bombe;
a delivery pipe connected to a discharge hole of the high pressure fuel pump through which the pressurized fuel is discharged;
an injector for directly injecting the fuel filled in the delivery pipe into a combustion chamber of the engine;
an electronic control portion for generating a control signal for controlling operations of a motor and an injector in the fuel pump and a valve in the high pressure fuel pump based on a target RPM of the engine; and
a motor controller for controlling driving of the motor in accordance with the control signal,
wherein the body of the high pressure fuel pump includes a micro-pipe portion that is configured to allow the high pressure portion to communicate with the low pressure portion, and wherein the micro-pipe portion includes a pipe which has a diameter determined to prevent the flow of the fuel in a liquid state, while ensuring the flow of the gaseous fuel.

6. The LPDI system of claim 5, further comprising a damper portion coupled to an upper portion of the body to form a part of the low pressure portion and to reduce pulsation of the fuel supplied through the suction hole, wherein the micro-pipe portion allows the high pressure portion to communicate with the damper portion.

7. The LPDI system of claim 6, wherein a tapered portion is formed on at least one of both longitudinal ends of the micro-pipe portion.

8. The LPDI system of claim 6, wherein the recovery hole is formed in the damper portion.

* * * * *